Jan. 29, 1929.

R. G. NELSON

PULLEY

Filed Aug. 12, 1927  2 Sheets-Sheet 1

1,700,416

Inventor
R. G. Nelson
By
Frease and Bond  Attorneys

Jan. 29, 1929.

R. G. NELSON

PULLEY

Filed Aug. 12, 1927

1,700,416

2 Sheets-Sheet 2

Inventor

R. G. Nelson

By Frease and Bond Attorneys

Patented Jan. 29, 1929.

1,700,416

UNITED STATES PATENT OFFICE.

REYNOLD G. NELSON, OF CANTON, OHIO, ASSIGNOR TO THE SPUN STEEL CORPORATION, OF CANTON, OHIO, A CORPORATION OF OHIO.

PULLEY.

Application filed August 12, 1927. Serial No. 212,497.

My invention relates to improvements in pulleys having a plurality of side by side annular grooves for use in connection with power drives such as rope drives, and more particularly drives including a plurality of V belts or the like.

In such power drives, it is necessary to have pulleys having different numbers of annular grooves therein for transmitting different amounts of power, and to have pulleys adapted for fitting on different sizes of shafts.

These requirements have made necessary the manufacture and carrying in stock of a great number of different pulleys each having a different number of annular grooves therein and/or adapted for use with a different size shaft.

Accordingly the objects of the present improvements include the provision of composite articles comprising pulleys each having a different plurality of annular grooves, and adapted for use with different size shafts, and each pulley including any desired plurality of separate pulleys having a single groove therein and adapted for connection with each other, and selectively with one of a number of different size shaft hubs; whereby the number of parts to be carried in stock in order to provide pulleys each having a different number of grooves therein and adapted for use with different size shafts is greatly reduced.

These and ancillary objects are attained by a construction and arrangement which may be stated in general terms as including a plurality of separate pulleys each having a peripheral flange containing an annular groove therein and a connecting disc flange therefor, a hub, and common means securing all of the connecting flanges upon the hub.

Figure 1:
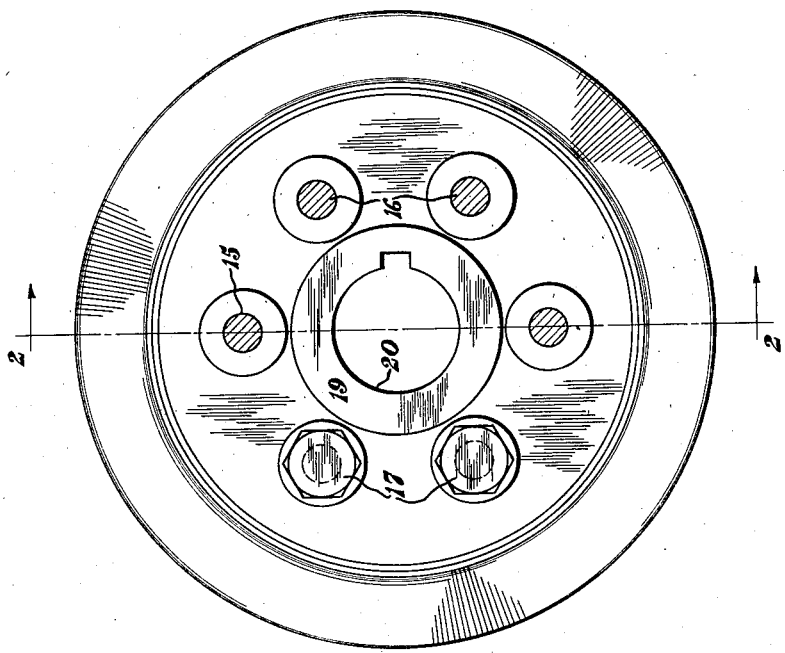
Figure 2:
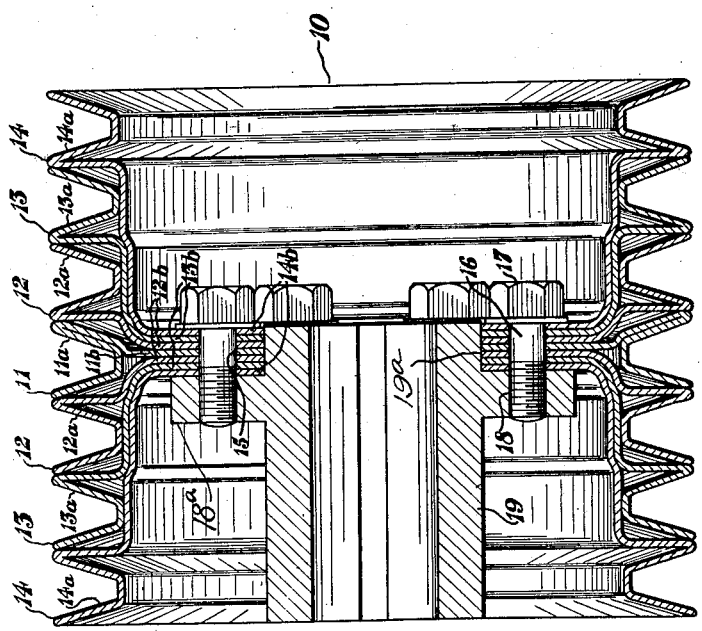
Figure 3:
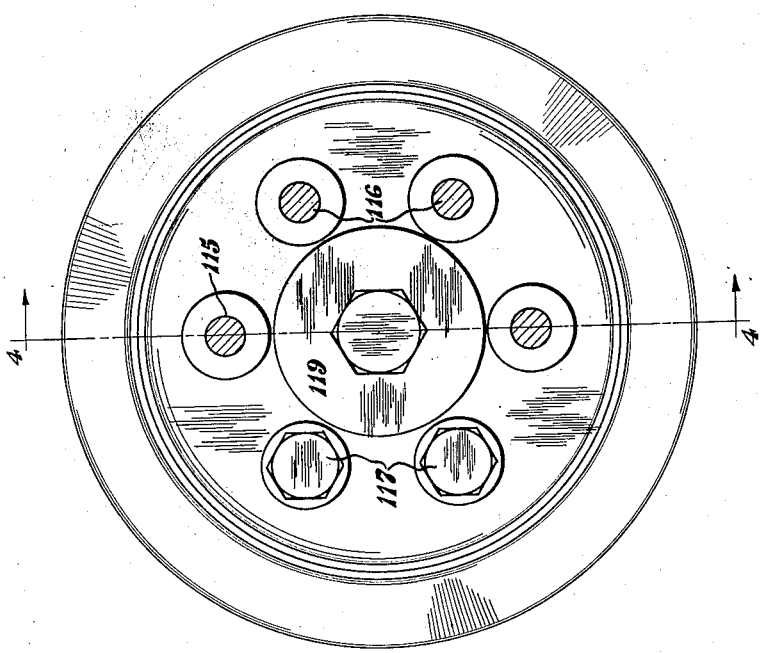

Preferred embodiments of my invention are illustrated in the accompanying drawings forming part hereof, in which Figure 1 is an end elevation of one embodiment of my improved pulley;

Fig. 2, a longitudinal axial sectional view thereof as on line 2—2, Fig. 1;

Fig. 3, a view similar to Fig. 1 of a modified embodiment of my invention; and

Figure 4:
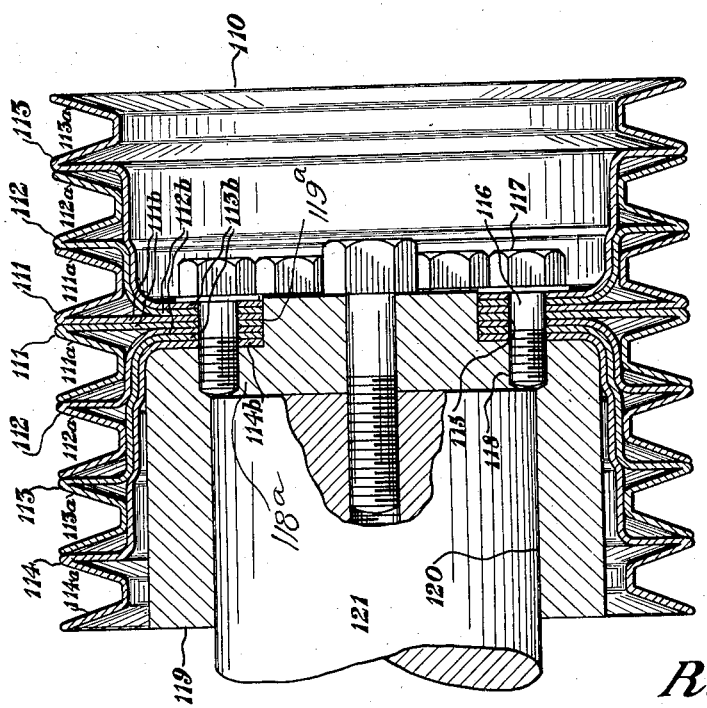

Fig. 4, a longitudinal axial sectional view thereof as on line 4—4, Fig. 3.

Similar numerals refer to similar parts throughout the drawings.

The embodiment of my invention illustrated in Figs. 1 and 2 and indicated generally at 10 comprises a composite article and includes a plurality of separate pulleys, 11, 12, 13 and 14.

The pulleys 11, 12, 13 and 14 include preferably tubular peripheral flanges $11^a$, $12^a$, $13^a$ and $14^a$, respectively, each containing an annular groove therein, and having inwardly extending therefrom, connecting disc flanges $11^b$, $12^b$, $13^b$ and $14^b$, respectively.

Each disc flange is provided with a plurality of apertures 15 registering with like apertures in the other disc flanges and adapted to receive the shanks 16 of screws 17 which are screwed into suitable threaded apertures 18 preferably provided in an outwardly extending flange $18^a$ of a hub 19 having a shaft bearing 20 therein of any desired diameter for keying upon a shaft not shown and of any desired diameter. The hub 19 preferably extends within and fits the inner edges of the disc flanges, as at $19^a$.

It is preferred to make each of the pulleys 11, 12, 13, and 14 of spun steel according to the method set forth in my prior application for patent, filed September 16, 1926, Serial No. 135,852, whereby the walls of each pulley are of uniform thickness and whereby a smooth and densified surface is provided for the wearing faces of the pulley groove.

The pulley assembly 10 includes a central pulley 11, on each side of which a pulley 12 is placed, and the disc flanges $12^b$ of the pulleys 12 abut opposite faces of the disc flange $11^b$ of the central pulley 11. On the outside of each pulley 12, a pulley 13 is placed, and the disc flanges $13^b$ of the pulleys 13 abut against the outer faces of the disc flanges $12^b$ of the pulleys 12; while on the outside of each pulley 13 a pulley 14 is placed, and the disc flanges $14^b$ of the pulleys 14 abut opposite faces of the disc flanges $13^b$ of the pulleys 13.

The grooves in the peripheral flanges $11^a$, $12^a$, $13^a$ and $14^a$ of the several pulleys are preferably identical in form, the remaining portions of the peripheral flanges $14^a$ are adapted to fit in the peripheral flanges $13^a$, which in turn are adapted to fit in the peripheral flanges $12^a$, which in turn are adapted to fit about the peripheral flange $11^a$, as illustrated.

The pulley assembly as illustrated includes seven annular grooves, this number may be reduced by eliminating one or more of the separate pulleys, or may be increased by adding a similarly constructed separate pulley, all the separate pulleys being securely connected to the driving hub 19 by means of the screws 17.

The modified embodiment of my invention illustrated in Figs. 3 and 4 and indicated generally at 110 comprises a composite article and includes a plurality of separate pulleys 111, 112, 113 and 114.

The pulleys 111, 112, 113 and 114 include preferably tubular peripheral flanges $111^a$, $112^a$, $113^a$ and $114^a$, respectively, each containing an annular groove therein, and having inwardly extending therefrom, connecting disc flanges $111^b$, $112^b$, $113^b$, and $114^b$, respectively.

Each disc flange is provided with a plurality of apertures 115 registering with like apertures in the other disc flanges and adapted to receive the shanks 116 of screws 117 which are screwed into suitable threaded apertures 118 preferably provided in an outwardly extending flange $118^a$ of a hub 119 having a shaft bearing 120 therein of any desired diameter for securing upon a shaft 121 and of any desired diameter. The hub 119 preferably extends within and fits the inner edges of the disc flanges, as at $119^a$.

It is preferred to make each of the pulleys 111, 112, 113 and 114 of spun steel according to the method set forth in my prior application for patent, filed September 16, 1926, Serial No. 135,852, whereby the walls of each pulley are of uniform thickness and whereby a smooth and densified surface is provided for the wearing faces of the pulley groove.

The pulley assembly 110 includes a pair of central pulleys 111, and the inner faces of the disc flanges $111^b$ abut each other. On the outside of each pulley 111, a pulley 112 is placed, and the inner faces of the disc flanges $112^b$ of the pulleys 112 abut against the outer faces of the disc flanges $111^b$ of the pulleys 111; while on the outside of each pulley 112, a pulley 113 is placed, and the inner faces of the disc flanges $113^b$ of the pulleys 113 abut against the outer faces of the disc flanges $112^b$ of the pulleys 112; and on the outside of one pulley 113 a pulley 114 is placed, and the inner face of the disc flange $114^b$ of the pulley 114, abuts the outer face of the disc flange $113^b$ of the adjacent pulley 113.

The grooves in the peripheral flanges $111^a$, $112^a$, $113^a$ and $114^a$ of the several pulleys are preferably identical in form, the remaining portions of the peripheral flanges $114^a$ are adapted to fit in the peripheral flanges $113^a$ which in turn are adapted to fit in the peripheral flanges $112^a$, which in turn are adapted to fit in the peripheral flanges $111^a$ as illustrated.

The pulley assembly as illustrated includes seven annular grooves, this number may be reduced by eliminating one or more of the separate pulleys, or may be increased by adding a similarly constructed separate pulley, all the separate pulleys being securely connected to the driving hub 119 by means of the screws 117.

I claim:

1. A composite article including a plurality of separate pulleys each having a peripheral flange containing an annular groove therein and a disc flange extending therefrom, a hub, and common means securing all of the disc flanges upon the hub.

2. A composite article including a plurality of separate pulleys each having a peripheral flange containing an annular groove therein and a disc flange extending therefrom, a hub, the hub extending within and fitting the inner edges of the disc flanges, an aperture in each disc flange registering with the like apertures in the other disc flanges, and a securing shank passing through all of the registering apertures and secured to the hub for mounting the flanges upon the hub.

3. A composite article including a plurality of separate pulleys each having a peripheral flange containing an annular groove therein and a disc flange extending therefrom, a hub, a plurality of apertures in each disc flanges registering with like apertures in the other disc flanges and a securing shank passing through each set of registering apertures and secured to the hub for mounting the flanges upon the hub.

4. A composite article including a plurality of separate pulleys each having a peripheral flange containing an annular groove therein and a disc flange extending therefrom, a hub, an outwardly extending flange on the hub, and common means securing all of the disc flanges to the outwardly extending hub flange.

5. A composite article including a plurality of separate pulleys each having a tubular peripheral flange containing an annular groove therein, a hub, and means connected with each tubular peripheral flange and with the hub for securing the flanges upon the hub.

In testimony that I claim the above, I have hereunto subscribed my name.

REYNOLD G. NELSON.